United States Patent
Tsukahara

(10) Patent No.: US 6,292,520 B1
(45) Date of Patent: *Sep. 18, 2001

(54) NOISE CANCELER UTILIZING ORTHOGONAL TRANSFORM

(75) Inventor: Yuriko Tsukahara, Kawasaki (JP)

(73) Assignee: Kabushiki Kaisha Toshiba (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/354,428

(22) Filed: Jul. 16, 1999

Related U.S. Application Data

(63) Continuation of application No. 08/918,994, filed on Aug. 27, 1997.

(30) Foreign Application Priority Data

Aug. 29, 1996 (JP) .................................................. 8-228652

(51) Int. Cl.[7] .............................. H03D 1/06; H04B 3/20; H04B 15/00; G10L 21/00; G10L 15/00
(52) U.S. Cl. ..................... 375/346; 370/286; 381/94.1; 704/205; 704/226; 704/233
(58) Field of Search ...................................... 375/346, 296, 375/278, 284, 285; 704/200, 203, 205, 206, 207, 226, 233; 370/286; 381/94.1

(56) References Cited

U.S. PATENT DOCUMENTS

| | | | |
|---|---|---|---|
| 4,628,529 | 12/1986 | Borth et al. | 381/94 |
| 4,811,404 | 3/1989 | Vilmur et al. | 381/94 |
| 5,577,161 | * 11/1996 | Pelaez Ferrigno | 395/2.35 |
| 5,659,622 | 8/1997 | Ashley | 381/94 |
| 5,668,927 | * 9/1997 | Chan et al. | 704/240 |
| 5,752,226 | * 5/1998 | Chan et al. | 704/233 |
| 5,812,970 | * 9/1998 | Chan et al. | 704/226 |

* cited by examiner

Primary Examiner—Stephen Chin
(74) Attorney, Agent, or Firm—Gray Cary Ware & Freidenrich LLP

(57) ABSTRACT

A noise canceler according to the invention orthogonally transforms a noise frame by means of an FFT and sorts its transform coefficients into N groups by means of a group by group basic reduction value determining section. Then, it compares the mean value of the transform coefficients of each of the groups with a threshold value and determines a basic reduction value according to the outcome of the comparison. Then, it operates to suppress the transform coefficients produced from the FFT by-means of a transform coefficient suppressing section on the basis of the basic reduction value.

4 Claims, 13 Drawing Sheets

NOISE CANCELER UTILIZING ORTHOGONAL TRANSFORM

This is a continuation of application Ser. No. 08/918,994, filed Aug. 27, 1997.

BACKGROUND OF THE INVENTION

This invention relates to a noise canceler to be installed in a telecommunications apparatus designed to encode voice signals for transmission such as a digital cordless telephone set or a digital wired telephone set that is suitably used with a digital portable telephone system or a PCS (personal communication service) system.

A low bit rate voice coding scheme such as the code excited linear prediction (CELP) scheme is popularly used for digital portable telephone sets. With such a coding scheme, voices spoken in an environment with a high background noise level can be clearly heard. The CELP scheme is discussed in detail in M. R. Schroeder and B. S. Atal: "Code-Excided Linear Prediction (CELP): High-Quality Speech at Very Low Bit Rates", in Proc. ICASSP, 1985, pp. 937–939.

However, spoken voices are remarkably blurred in environments with a high background noise level including buses and commuter trains. Efforts have been made to develop noise cancelers that eliminate noises and encode only voices. Known papers discussing noise cancelers include "Suppression of Acoustic Noise in Speech Using Subtraction" (IEEE rans., vol. ASSP-27, pp. 113–120, April 1979).

The technology discussed in this paper can be summarized as follows. An observed signal is firstly divided into frames with 256 samples and an orthogonal transform operation such as fast Fourier transform is conducted on each of the frames to analyze the frequencies of the signal. Meanwhile, the magnitudes $u(i)$ of the Fourier transform coefficients i of the noise components are observed in advance so that the transform coefficients (i) of the frames of the observed signal may be suppressed by means of the formula below.

$$S\char`\^(i) = \max(0, \|s(i)\| - u(i))^* \text{sign}(s(i))$$

Then, the suppressed transform coefficients $S\char`\^(i)$ are subjected to an inverse fast Fourier transform (IFFT) to recover the signal, which is subsequently sent to a voice coding section. In this way, the power corresponding to the noise is subtracted from the transform coefficients so that it is theoretically possible to eliminate the noise component from the observed signal and recover the voice.

A constancy is assumed in the transform span for a frequency analysis using orthogonal transform such as FFT. However, the voice is not constant within a frame, nor is the noise if viewed as individual transform coefficient. Both voice and noise can fluctuate with time. Thus, with a known noise canceler that assumes a constancy in the transform span, part of the noise component may remain and/or part of the voice frequencies may be lost or damaged in the noise eliminating operation. These problems then appear as a noise having a specific frequency that can be more annoying than the original sound prior to the noise eliminating operation to baffle the effort for noise suppression.

Generally, an FFT with 256 dimensions is used for a noise canceler. However, an FFT with 256 dimensions involves a large volume of arithmetic operations and hence is not feasibly applicable to small telecommunications apparatus such as portable telephone sets and, therefore, an FFT with dimensions as low as 128, 64 or 32 may have to be used for noise cancelers to be used in small telecommunications apparatus including portable telephone sets. However, an FFT with reduced dimensions is accompanied by a drawback of a long frame length that is longer than the pitch cycles of voice. If a noise eliminating operation is conducted with such a long frame length, assuming a constancy in the transform span as described above, the pitch cycles of voice can be distorted due to the suppressed transform coefficients in a lower frequency band to reproduce a queerly sounding speech if the noise is suppressed effectively.

BRIEF SUMMARY OF THE INVENTION

Therefore, the first object of the present invention is to provide a noise canceler that can effectively eliminate the noise components of a sending speech signal to improve the quality of speech.

The second object of the present invention is to provide a noise canceler that does not distort the voice in a noise suppressing operation if an orthogonal transform with dimensions smaller than the pitch cycles of voice is used so that the noise canceler may operate with a reduced volume of arithmetic operations without degrading the quality of the voice being transmitted.

To achieve the first object, a noise canceler according to the invention divide a sending speech signal by into frames with a constant frame length and carries out an orthogonal transform for frequency analysis on each frame. Then, suppression means of the noise canceler sorts the transform coefficients obtained by the orthogonal transform into a plurality of groups and performs a suppressing operation on the transform coefficients on a group by group basis.

In a first aspect, the suppression means may operate in the following manner. It determines the mean value of the transform coefficients of each of the plurality of groups and compares the mean value of the transform coefficients of each of the plurality of groups with a predetermined threshold value. Then, it uses a minimum value for the transform coefficients of each of the plurality of groups when the mean value of the transform coefficients does not exceed the threshold value and carrying out a suppression processing operation on the transform coefficients according to the absolute values or the square values of the transform coefficients when the mean value of the transform coefficients exceeds the threshold value on the basis of the outcome of the comparison means.

In a second aspect, the suppression means may operate in a manner as described below. Firstly, it determines the mean value of the transform coefficients of each of the plurality of groups and compares the mean value of the transform coefficients of each of the plurality of groups with a predetermined threshold value. Then, it selects a predetermined first value as basic reduction value when the mean value of the transform coefficients exceeds the threshold value and selects a second value that is sufficiently greater than the value as basic reduction value when the mean value of the transform coefficients does not exceed the threshold value. Thereafter, it compares the absolute values of the transform coefficients of each of the plurality of groups and suppresses the transform coefficients of each of the plurality of groups to values obtained by subtracting the basic reduction value from their absolute values and adding a predetermined proportion of each of the absolute values to the outcome of the related subtraction when the absolute values of the transform coefficients of the group exceed the basic reduction value and to values each of which is a predetermined proportion of the absolute value of the related transform coefficient on the basis of the outcome of the second comparison means.

Thus, according to the invention, the transform coefficients obtained by orthogonally transforming the frames of the input voice are treated not as individual coefficients but a set of a plurality of coefficients and divided into groups typically by splitting them according to their frequencies. Then, the coefficients belonging to each of the groups are suppressed strongly if the mean value of the coefficients does not exceed the mean value of the noise levels, whereas they are suppressed only weakly if the mean value of the coefficients exceeds the mean value of the noise levels.

Therefore, with the present invention, the suppressing operation can be carried out under optimum conditions for each of the groups of transform coefficients taking fluctuations in the effect of the transform coefficients into consideration so that the noise components can be effectively eliminated to improve the quality of communication if compared with any known noise cancelers designed to suppress transform coefficients uniformly under same conditions.

The second object of the invention is achieved by providing a noise canceler that divides a sending speech signal into frames with a constant frame length, performs an orthogonal transform for frequency analysis on each frame and divides the transform coefficients into a first transform coefficient group contained in a lower band relative to the frequencies corresponding to the pitch cycles of voice and a second transform coefficient group contained in a higher band relative to the frequency. Then, it suppresses the first transform coefficient group to a predetermined proportion thereof and the second transform coefficient group to different respective proportions on a coefficient by coefficient basis.

This noise canceler of the present invention has the following effects. If an orthogonal transformer with dimensions smaller than the pitch cycles of voice is used for carrying out a noise canceling operation by means of an SS (spectral subtraction) technique, the voice is distorted to degrade the quality of the transmitted voice if the noise components may be eliminated. The inventor of the present invention looked into this degradation of the voice quality and found that a spectral distortion occurs in a lower frequency band to make the voice that is spectrally lopsided to the lower band is further distorted when an orthogonal transform is conducted with dimensions smaller than the pitch cycles of voice. Therefore, according to the invention, the transform coefficients obtained by an orthogonal transform and belonging to a higher band are suppressed with different respective gains on a one by one basis, whereas those belonging to a lower band are suppressed with a constant gain. With this arrangement, the voice that is spectrally lopsided to the lower band are not subjected to distortions and the noise components are effectively eliminated if a orthogonal transformer with dimensions smaller than the pitch cycles of voice is used.

According to the invention, there is also provided a noise canceler that divides a sending speech signal into frames with a constant frame length, performs an orthogonal transform for frequency analysis on each frame and divides the transform coefficients obtained by the orthogonal transform means into a first transform coefficient group contained in a lower band relative to the frequencies corresponding to the pitch cycles of voice, a second transform coefficient group contained in a higher band relative to a predetermined second frequency higher than the first frequency and a third transform coefficient group contained in an intermediate band higher relative to the first frequency and lower relative to the second frequency. Then, it suppresses the first transform coefficient group to a predetermined proportion, the second transform coefficient group splitted by the band splitting means to different respective proportions on a coefficient by coefficient basis and the third transform coefficient group so as to interpolate the suppression of the first transform coefficient group and the suppression of the second transform coefficient group.

Thus, the intermediate transform coefficient group is suppressed to interpolate the suppression of the first transform coefficient group and the suppression of the second transform coefficient group so that the linear continuity in the intermediate frequency band connecting the lower band and the higher band is enhanced in the axial direction of frequencies and the noise components can be eliminated further effectively.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION (1st Embodiment)

Figure 1:
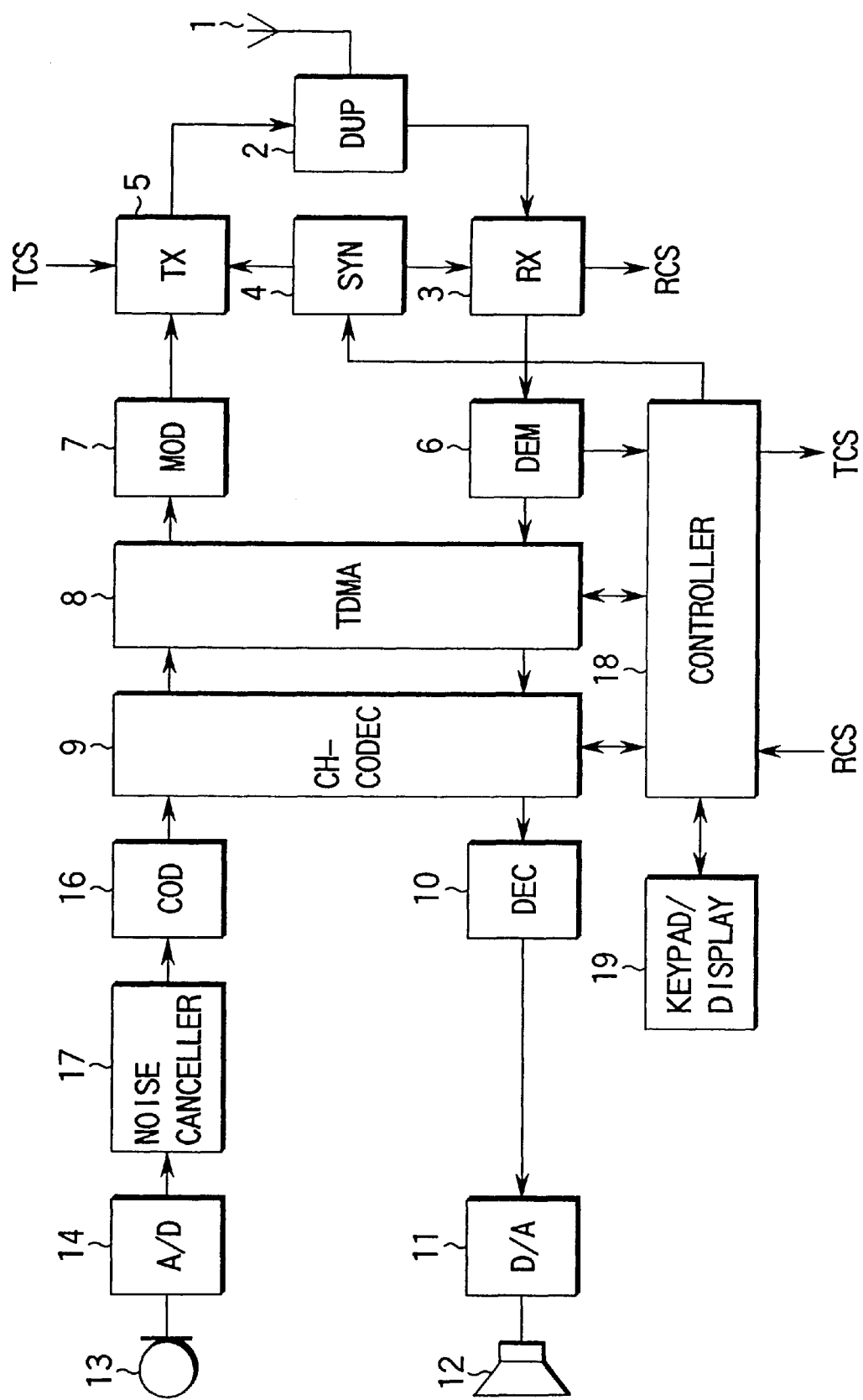
FIG. 1 is a circuit block diagram of a first embodiment of digital portable telephone set provided with a noise canceler according to the invention.

FIG. 1 is a circuit block diagram of a first embodiment of digital portable telephone set comprising a noise canceler according to the invention.

Referring to FIG. 1, a radio carrier signal transmitted from a base station (not shown) by way of a radio channel is received by an antenna 1 and entered into a receiving circuit (RX) 2 by way of a duplexer (DUP) 2. The radio carrier signal is mixed with a receiver local oscillation signal produced from a frequency synthesizer (SYN) 4 and then down-converted into an intermediate frequency signal. The reception intermediate frequency signal is then sampled by an A/D converter (not shown) before it is entered into a digital demodulator (DEM) 6.

The digital demodulator 6 effectuates frame synchronization and bit synchronization for said digital reception intermediate frequency signal and processes it for digital demodulation. The base band digital demodulation signal obtained by this demodulation processing is entered into a time division multiple access (TrDMA) circuit 8, where the time slot allocated to the telephone set is separated and taken out for each transmission frame. The information obtained by said digital demodulator 6 is entered into a control circuit 18.

The digital demodulation signal sent out from said TDMA circuit 8 is then entered into a channel-encoder/decoder (hereinafter referred to as channel-codec) (CH-CODEC) 9, where it is processed for error correction decoding. The digital demodulation signal processed for error correction decoding is then entered into a speech decoder (DEC) 10, where it is processed for speech decoding to reproduce a digital receiving speech signal. The digital receiving speech signal is brought into an analog receiving speech signal by a D/A converter 11 before it is fed to a loudspeaker 12 by way of a sound amplifier (not shown) and sounded by the loudspeaker 12.

On the other hand, the speech of the speaker is transformed into an electric signal by an microphone 13, which signal is sampled at a predetermined cycle and converted into a digital sending speech signal by an A/D converter 14. After passing through a noise canceler 17 that will be described hereinafter, the digital sending speech signal is entered into a speech encoder (COD) 16 for encoding.

The coded speech data sent out from the COD 16 is entered into the channel-codec 9 for error correction coding. The digital sending speech signal that is coded for error correction is then sent to the TDMA circuit 8, which generates a transmission frame corresponding to the TDMA system. Then, a processing operation is carried out on the transmission frame to insert the digital sending speech signal into the time slot of the transmission frame allocated to the telephone set. The digital sending speech signal produced from the TDMA circuit 8 is subsequently sent to a digital modulator (MOD) 7.

The digital modulator 7 produces a transmission intermediate frequency signal obtained by digital modulation using said digital sending speech signal, which transmission intermediate frequency signal is then converted into an analog signal by a D/A converter (not shown) before entered into a transmission circuit (TX) 5. A /4 shifted quadrature phase shift keying method is typically used for digital modulation.

In the transmission circuit 5, the modulated transmission intermediate frequency signal is mixed with a transmitter local oscillation signal produced from a frequency synthesizer 4 and up-converted into a radio carrier signal having a radio carrier frequency corresponding to the uplink channel. The radio signal with the modulated frequency is made to have a predetermined transmission power level specified by a control signal TCS from the control circuit 18 of a transmission power amplifier before it is transmitted to the base station (not shown) from the antenna 1 by way of the duplexer 2.

Reference numeral 19 in FIG. 1 denotes a keypad/display, which keypad/display 19 is provided with a call originating key, a call terminating key, dialing keys and various function keys along with a liquid crystal display (LCD) and one or more than one light emitting diode (LED).

Figure 2:
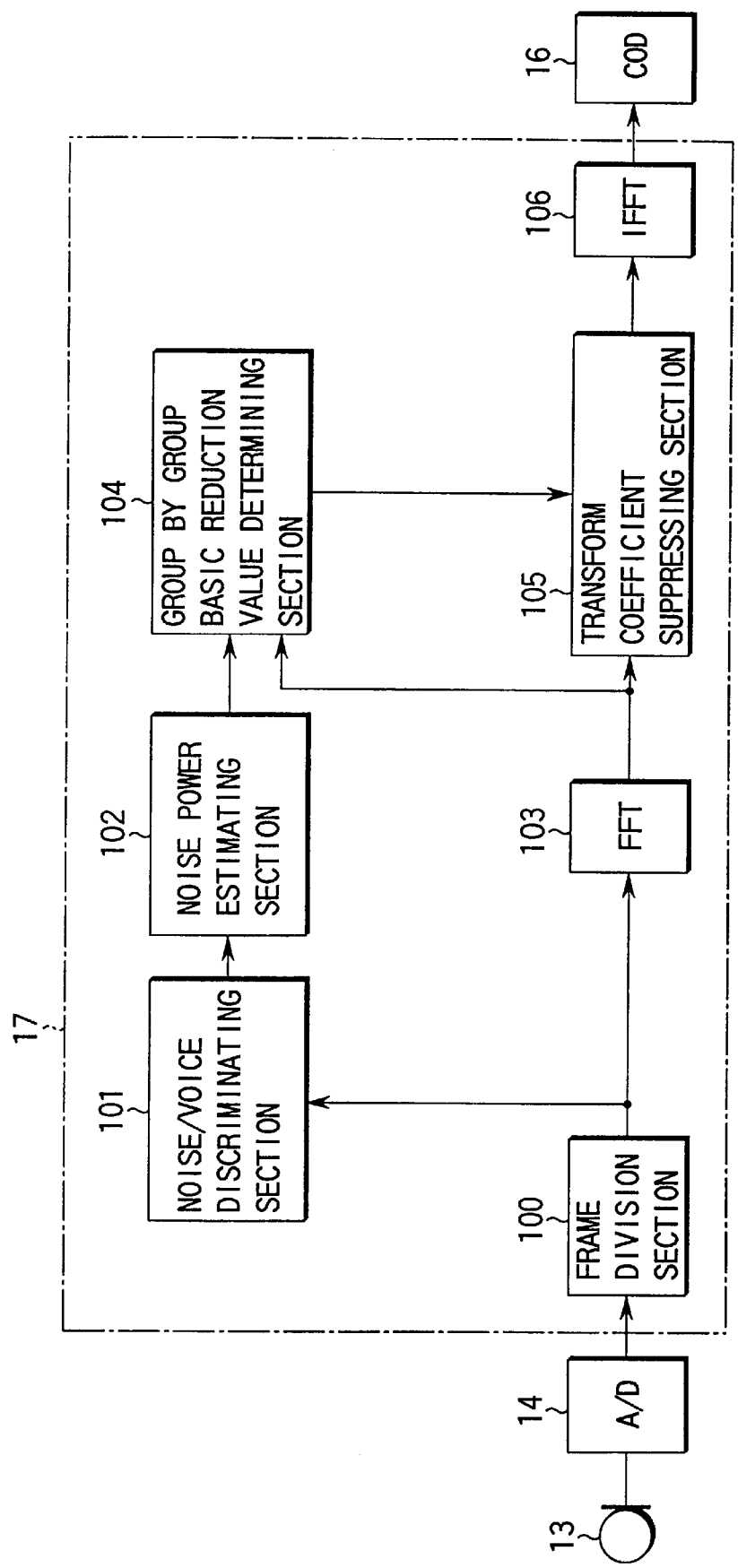
FIG. 2 is a circuit block diagram of the noise canceler of the digital portable telephone of FIG. 1.

The noise canceler 17 has a configuration as will be described below by referring to FIG. 2 showing a circuit block diagram of the noise canceler 17.

The digital transmission signal produced from the A/D converter 14 is divided to show a given constant length and put into frames by a frame division section 100. The framed digital transmission signal is then sent to a noise power estimating section 102 by way of a noise/voice discriminating section 101 and also to a fast Fourier transform circuit (FFT) 103. Each frame typically has a frame length FL equal to 256 samples.

The noise/voice discriminating section 101 determines if the current frame is a voice frame or a noise frame on the basis of the estimated value of the noise level and displays a discrimination flag showing the outcome of its discriminating operation. For example, the discrimination flag is cleared to show "0" when the current frame is determined to be a noise frame, whereas the discrimination flag is set to "1" when the current frame is determined to be a voice frame. Techniques that can be used for discriminating noise and voice are discussed in detail in a number of papers including "A Study on the Techniques of Sequentially Selecting Threshold Values for Discriminating Presence/Absence of Telephone Voice" (The Spring National Assembly of the Electronic Information and Telecommunications Society, B-328, 1988).

It the noise/voice discriminating section 101 determines that the current frame is a noise frame and shows the fact by means of the discrimination flag, the noise power estimating section 102 determines by calculation the mean square of the signal values a(i) of the current noise frame and then the average of the mean square and the past root mean squares it stores and transmits the outcome to a group by group basic reduction value determining section 104 as noise power value Pow.

Figure 3:
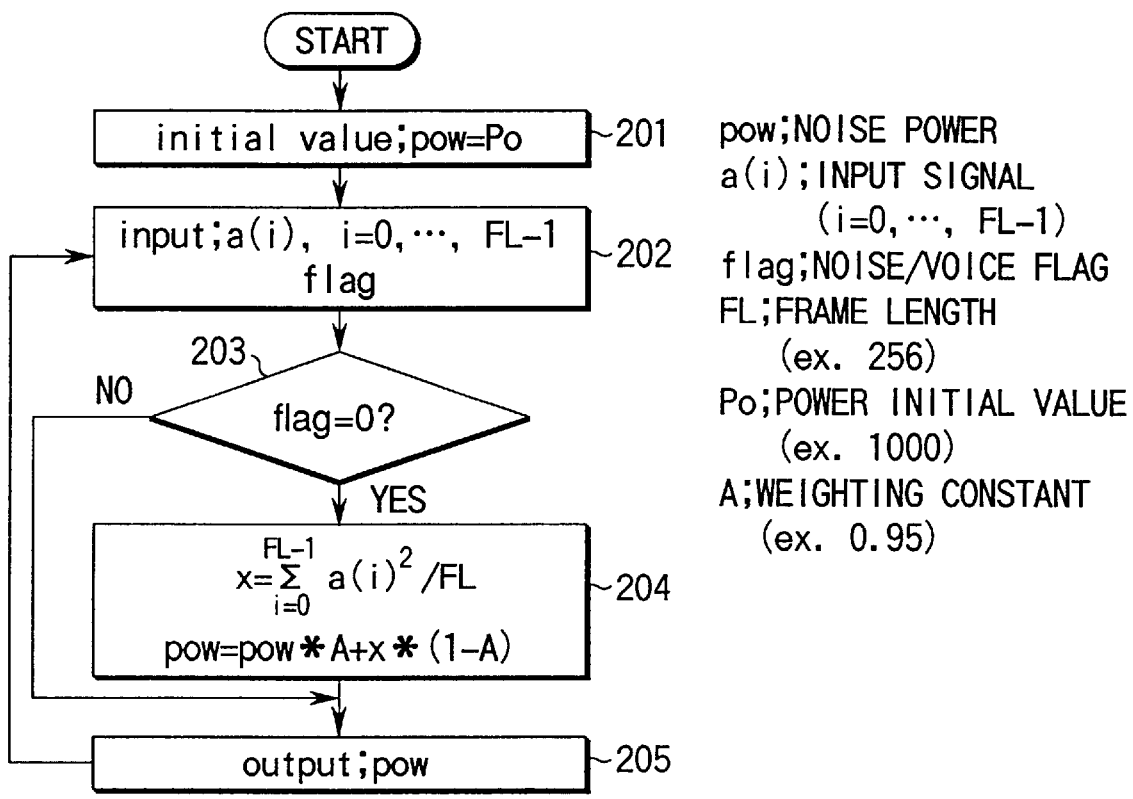
FIG. 3 is a flow chart showing the procedures of the operation of estimating the noise power of the noise canceler of FIG. 2.

FIG. 3 is a flow chart for the operation of estimating a noise power, showing the procedures to be followed for carrying out the operation.

Referring to FIG. 3, the noise power value Pow is initialized in Step 201 and the signals values a(i) of the noise frame and the discrimination flag of the noise/voice discriminating section 101 are entered in Step 202. If the discrimination flag shows "0", the operation proceeds from Step 203 to Step 204 to determine the noise power value Pow by calculation and the obtained noise power value Pow is transmitted to the group by group basic reduction value determining section 104 in Step 205.

The noise canceler 17 additionally comprises a FFT 103 for carrying out a fast Fourier transform on the signal values a(i) of the noise frame. The obtained transform coefficients S(j) are then sent to the group by group basic reduction value determining section 104 from it. While transform coefficients S(j) take the form of an imaginary number, it is assumed herein that a transform coefficient represents a real part if j is an odd number and an imaginary part if j is an even number. The number of transform coefficients is made equal to the frame length FL.

The group by group basic reduction value determining section 104 divides the transform coefficients fed from the FFT 103 into a plurality of groups and determines a basic reduction value thr(i) (i=0, . . . , N−1) to be used for controlling the transform coefficient suppressing operation for each group. Note that transform coefficients showing similar frequency characteristics are sorted into a same group. More specifically, those whose frequencies are close to one another may be grouped. The number of groups N may be eight, or N=8, and all the groups may have a same number of coefficients (e.g., 32), although, alternatively, the groups may have different numbers of coefficients.

Figure 4:
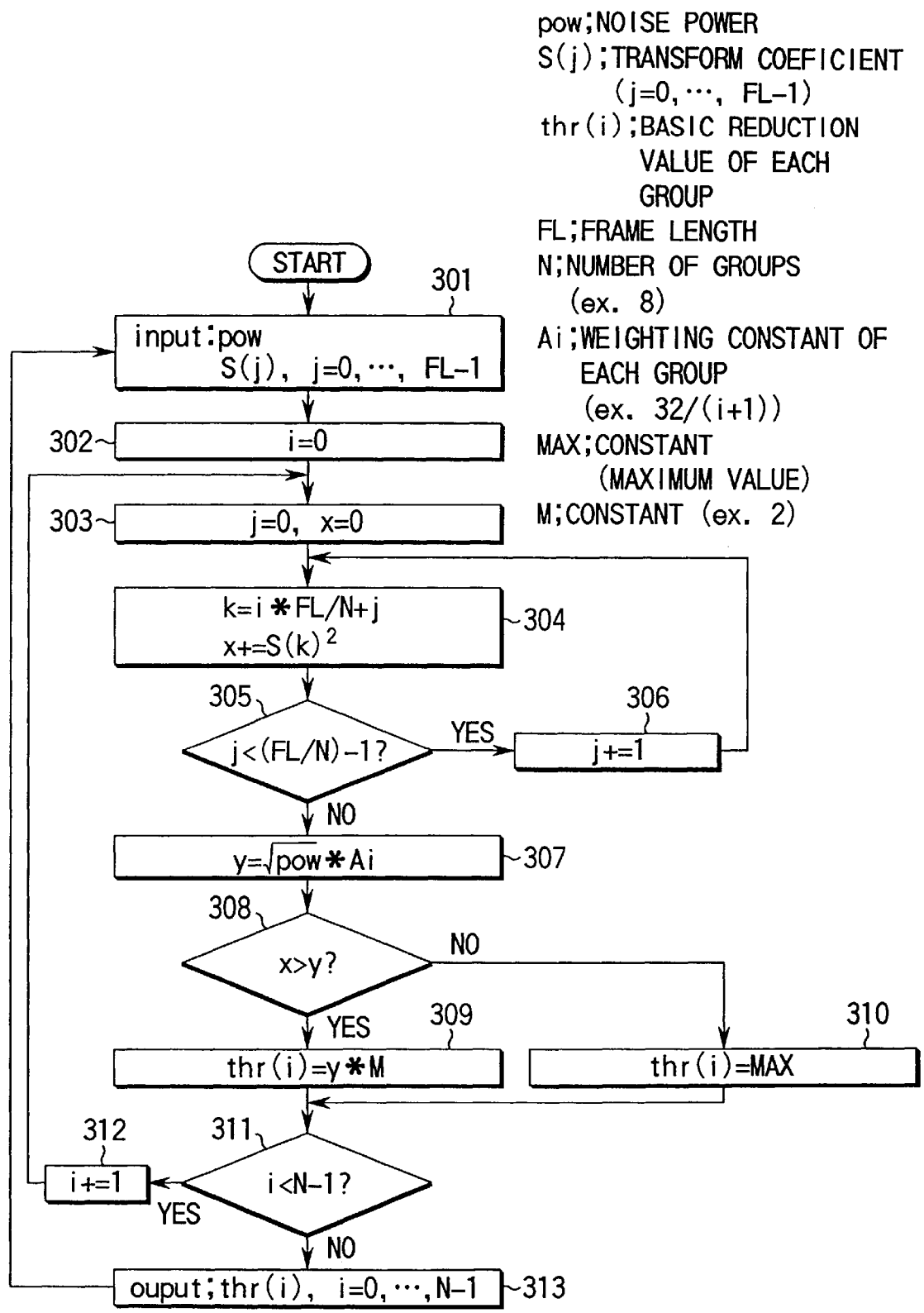
FIG. 4 is a flow chart showing the procedures of the operation of the group by group basic reduction value determining section of the noise canceler of FIG. 2.

FIG. 4 is a flow chart for the operation of the group by group basic reduction value determining section 104, showing the procedures to be followed for carrying out the operation.

Referring to FIG. 4, the group by group basic reduction value determining section 104 firstly takes out the noise power value Pow in the noise power estimating section 102 and also the transform coefficients S(j) (j=0, . . . , FL−1) in the FFT 103 in Step 301. It then resets the group number i to the initial value of 0 in Step 302 and also j and x to 0, or j=0 and x=0, in Step 303. It divides the transform coefficients S(j) into N groups and determines by calculation the mean square x of the transform coefficients S(j) for each of the groups. This operation of obtaining the root mean square of the transform coefficients S(j) is repeated each time j is incremented in Step 306 and terminated when j is found to be not smaller than FL/N in Step 305.

When the mean square value x is determined for the transform coefficients of the No. i=0 group, the group by group basic reduction value determining section 104 multiply this mean square value x by a weighting constant Ai (e.g., Ai=32/(i+1)) preset for the noise power value Pow to obtain a threshold value y in Step 307. Then, in Step 308, the mean square value x of the transform coefficients is compared with the threshold value y. If the mean square value x is found to be smaller than the threshold value y as a result of the comparison, the operation proceeds to Step 310, where the basic reduction value thr(i) is determined to be equal to a predetermined maximum value MAX for the group. If, on the other hand, the mean square value x of the transform coefficients is found to be not smaller than the threshold value y, the operation proceeds to 309, where the threshold value y is multiplied by a constant M (e.g., M=2) and the basic reduction value thr(i) is determined to be equal to the product of the multiplication for the group.

The above operation of determining by calculation the mean square value x of the transform coefficients, comparing the obtained value x and the threshold value y and selecting a value for the basic reduction value thr(i) according to the result of the comparison is repeated for each of the groups (i=0, . . . , N−1) as i is incremented in Step 312. The above described series of processing steps is terminated for the current noise frame when i becomes equal to N, or i=N. Then, the operation moves from Step 311 to Step 312, where the obtained basic reduction values thr(i) are transmitted to the transform coefficient suppression section 105 for all the groups.

The transform coefficient suppression section 105 operates for suppressing the transform coefficients S(j) fed from the FFT 103 on the basis of the basic reduction values thr(i) determined by the group by group basic reduction value determining section 104 for all the groups.

Figure 5:
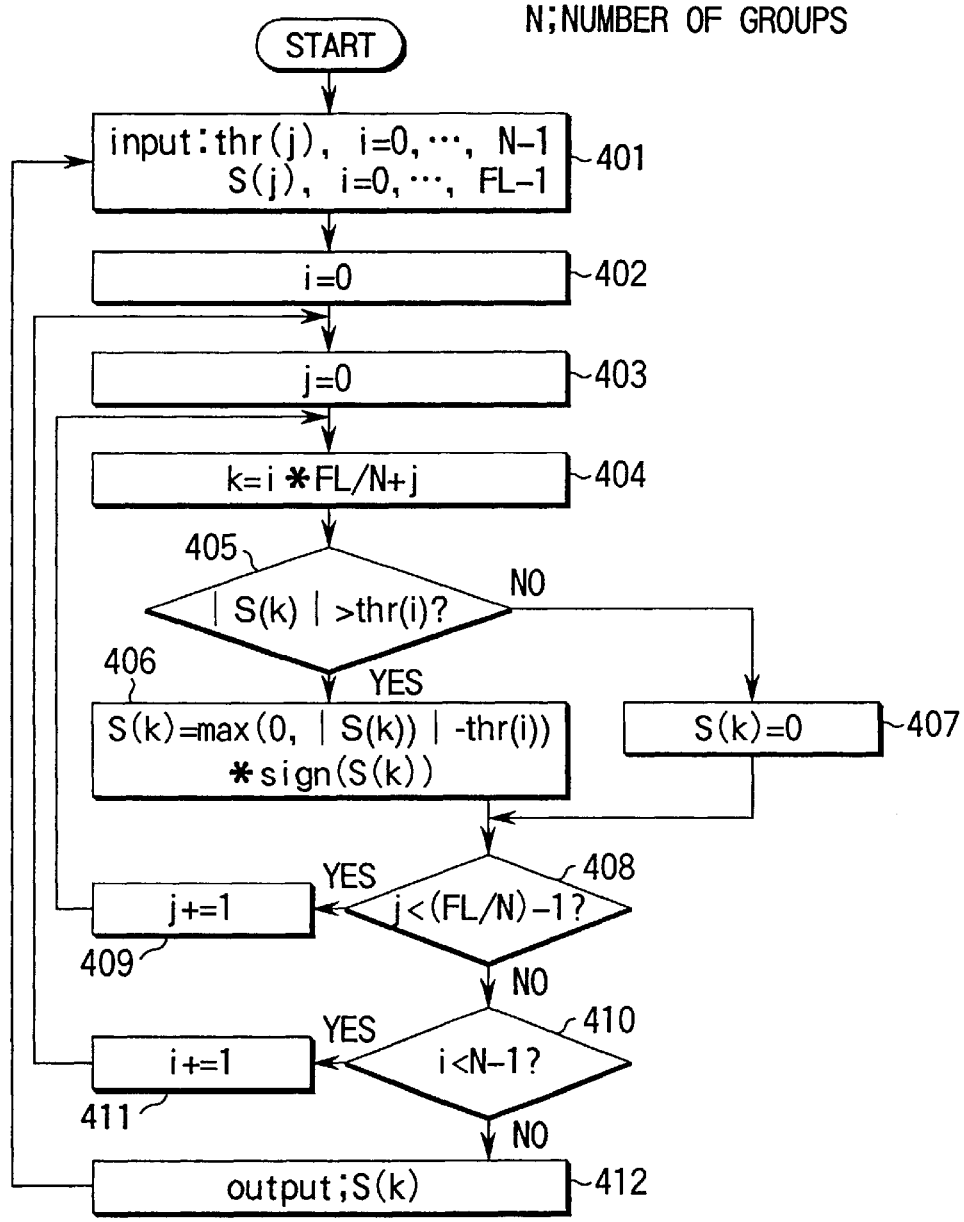
FIG. 5 is a flow chart showing the procedures of the operation of the transform coefficient suppression section of the noise canceler of FIG. 2.

FIG. 5 is a flow chart for the operation of the transform coefficient suppression section 105, showing the procedures to be followed for carrying out the operation.

Referring to FIG. 5, the transform coefficient suppression section 105 firstly takes out the basic reduction values thr(i) in the group by group basic reduction value determining section 104 for all the groups and also the transform coefficients S(j) in the FFT 103 in Step 401. It then resets i and j to the respective initial values of i=0 and j=0 in Steps 402 and 403 respectively and goes to Step 404, where it divided the transform coefficients S(j) into N groups. Then, in Step 405, it compares the absolute value of the coefficient S(k) of the i-th group with the basic reduction value thr(i) for that group. If it is found in this step that the absolute value of coefficient S(k) is not smaller than the basic reduction value thr(i), it goes to Step 406, where it suppress the value of the coefficient S(k) to the value obtained by subtracting the basic reduction value thr(i) from the absolute value of S(k). If, on the other hand, it is found that the absolute value of coefficient S(k) is smaller than the basic reduction value thr(i) for this group, the coefficient S(k) is reset to zero.

The transform coefficient suppression section 105 performs the above described processing operation for the coefficient S(i) of each of the groups and, when the above described steps for suppressing the transform coefficient of each and every one of the groups of the current frame are terminated, it moves to Step 412, where it outputs the above coefficients S(k).

The suppressed coefficients S(k) produced from the transform coefficient suppression section 105 are then given to an inverse fast Fourier transform circuit (IFFT) 106, which carries out a fast Fourier transform operation on the suppressed coefficients S(k) to put them back into a time base signal. The coefficients put back into a time base signal are then fed to the voice coding circuit 16.

As described above, the first embodiment of noise canceler carries out an orthogonal transform for each noise frame by means of an FFT 103 and divides the transform coefficients S(j) of the frame into N groups by a group by group basic reduction value determining section 104. Then, it determines the mean value of the transform coefficients for each group and compares it with a threshold value. It further determines a basic reduction value according to the result of the comparison and suppresses the transform coefficients produced from the FFT 103 by means of a transform coefficient suppression section 105 on the basis of the basic reduction value.

Therefore, the operation of suppressing transform coefficients is conducted under optimal conditions for each group to realize an optimal suppressing operation by taking fluctuations in the effectiveness of individual transform coefficients into consideration so that the noise components in the transmitted signal can be effectively eliminated.

(2nd Embodiment)

Figure 6:
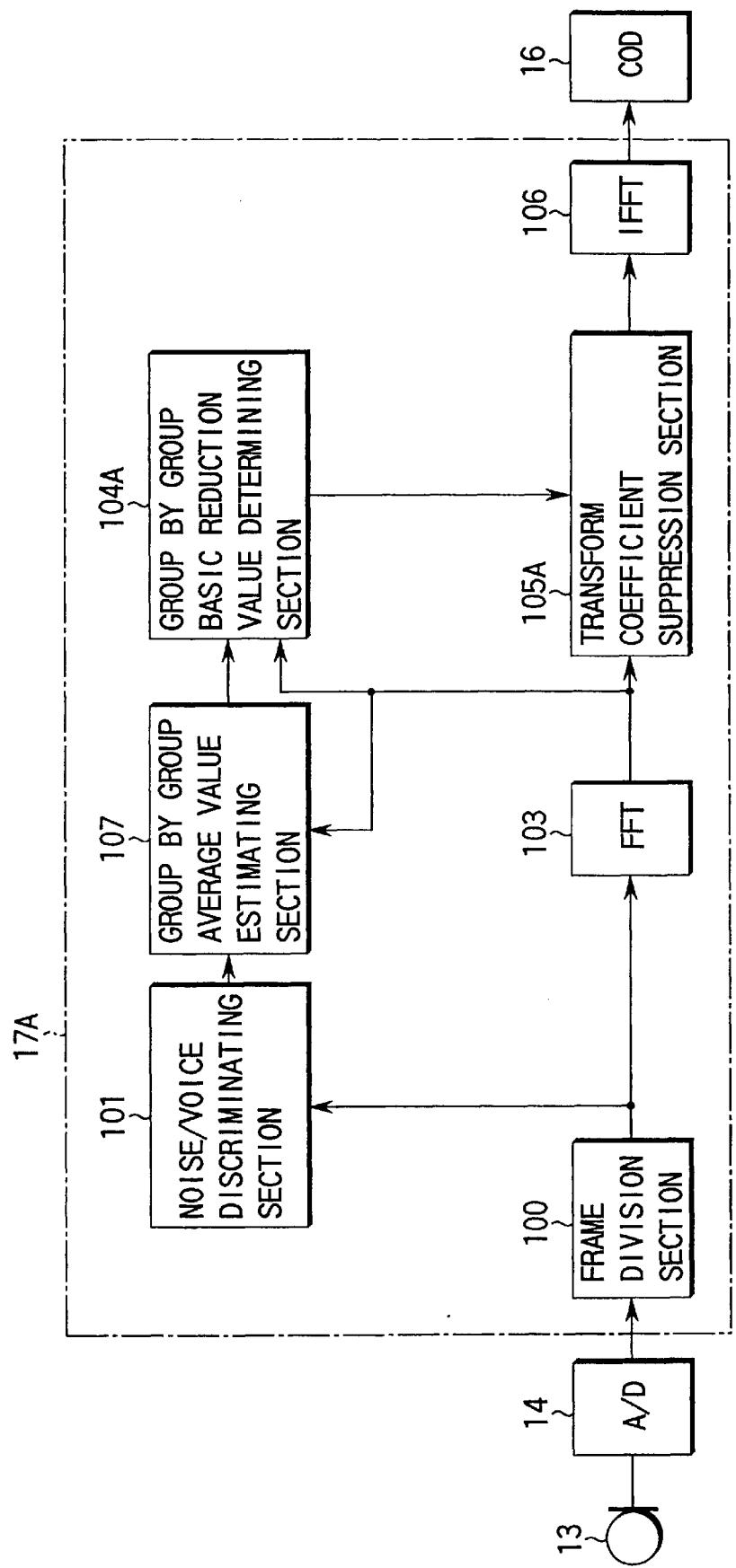
FIG. 6 is a circuit block diagram of a second embodiment of noise canceler according to the invention.

FIG. 6 is a circuit block diagram of a second embodiment of noise canceler according to the invention. The components that are similar to those of FIG. 2 are denoted respectively by the same reference symbols and will not be described any further.

The noise canceler 17A of this embodiment additionally comprises a group by group mean value estimating section 107 directly upstream relative to the group by group basic reduction value determining section 104A. The group by group mean value estimating section 107 divides the transform coefficients S(j) of a noise frame into N groups and calculates the mean value of the transform coefficients within each of the groups, or group's noise mean value avr(i) (i=0, . . . , N−1). Assume here that the number of groups is eight, or N=8, as in the above description on the first embodiment and all the groups have an equal number of transform coefficients, which is equal to thirty two.

Figure 7:
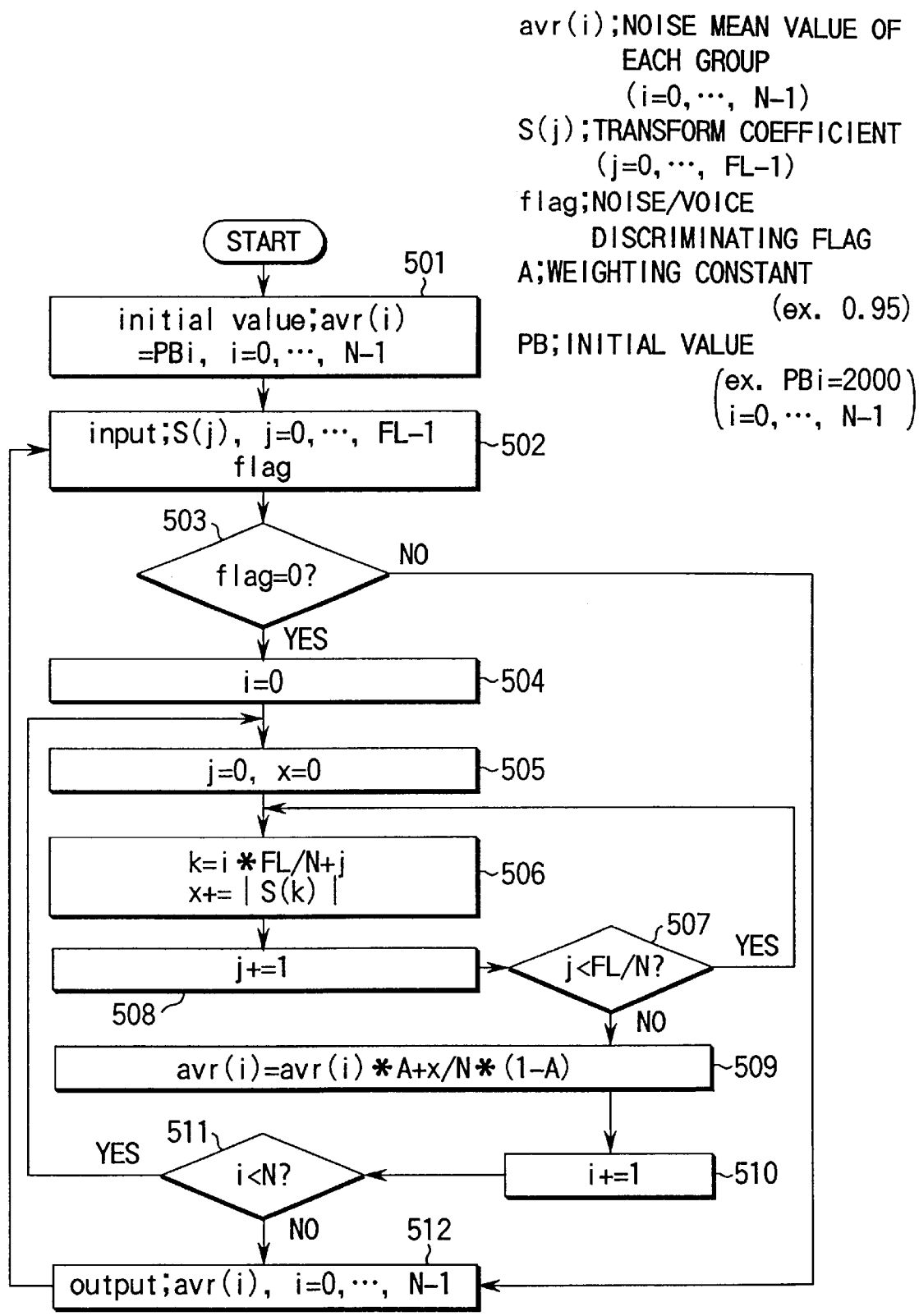
FIG. 7 is a flow chart showing the procedures of the operation of the group by group average value estimating section of the noise canceler of FIG. 6.

FIG. 7 is a flow chart for the operation of the group by group mean value estimating section 107, showing the procedures to be followed for carrying out the operation.

Referring to FIG. 7, the group by group mean value estimating section 107 initializes the group's noise mean value avr(i) to PBi (i=0, . . . , N−1). Assume here avr(i)=2000 or that the mean value of the groups of the leading frame is used. In Step 502, the group by group mean value estimating section 107 takes out the transform coefficients S(j) (j=0, . . . , FL−1) in the FFT 103 and also the discrimination flag in the noise/voice discriminating section 101 and then, in Step 503, determines if the current frame is a noise frame or not on the basis of the discrimination flag. If the current frame is a voice frame, the group by group mean value estimating section 107 proceeds to Step 512, where it only outputs the noise mean values avr(i) of the groups down to the immediately preceding frame.

If, on the other hand, the current frame is a noise frame, the group by group mean value estimating section 107 initializes i and j and x respectively to i=0 and j=0 and x=0 in Steps 504 and 505 and, thereafter, divides S(j) into N groups in Step 506. Then, it determines by calculation the sum of the absolute values of the transform coefficients x=∥S(k)∥ of each of the groups. This operation of calculating the sum of the absolute values of the transform coefficients is repeated each time j is incremented in Step 508 and terminated when j is found not smaller than FL/N in Step 507.

When the sum of the absolute values of the transform coefficients x of group No. i=0 is obtained, the operation moves to Step 509, where the noise mean values avr(i) of the groups down to the immediately preceding frame are integrated to determine the noise mean values avr(i) of the groups down to the current frame.

In the same way, the operation returns to Step 505 each time i is incremented in Step 510 and the above described processing steps for determining the noise mean values avr(i) of the groups are repeated. As a result, the noise mean value avr(i) is determined for each of the groups. The above operation is repeated until j is found not smaller than N in Step 511 so that a noise mean value avr(i) is determined for each and every one of the N groups, when the operation proceeds from Step 511 to Step 512, where the groups' noise mean values avr(i) are transmitted to the group by group basic reduction value determining section 104A.

In the group by group basic reduction value determining section 104A, there is conducted an operation of determining the basic reduction value thr(i) (i=0, . . . , N−1) for each of the groups, using the noise mean value avr(i) of the group.

Figure 8:
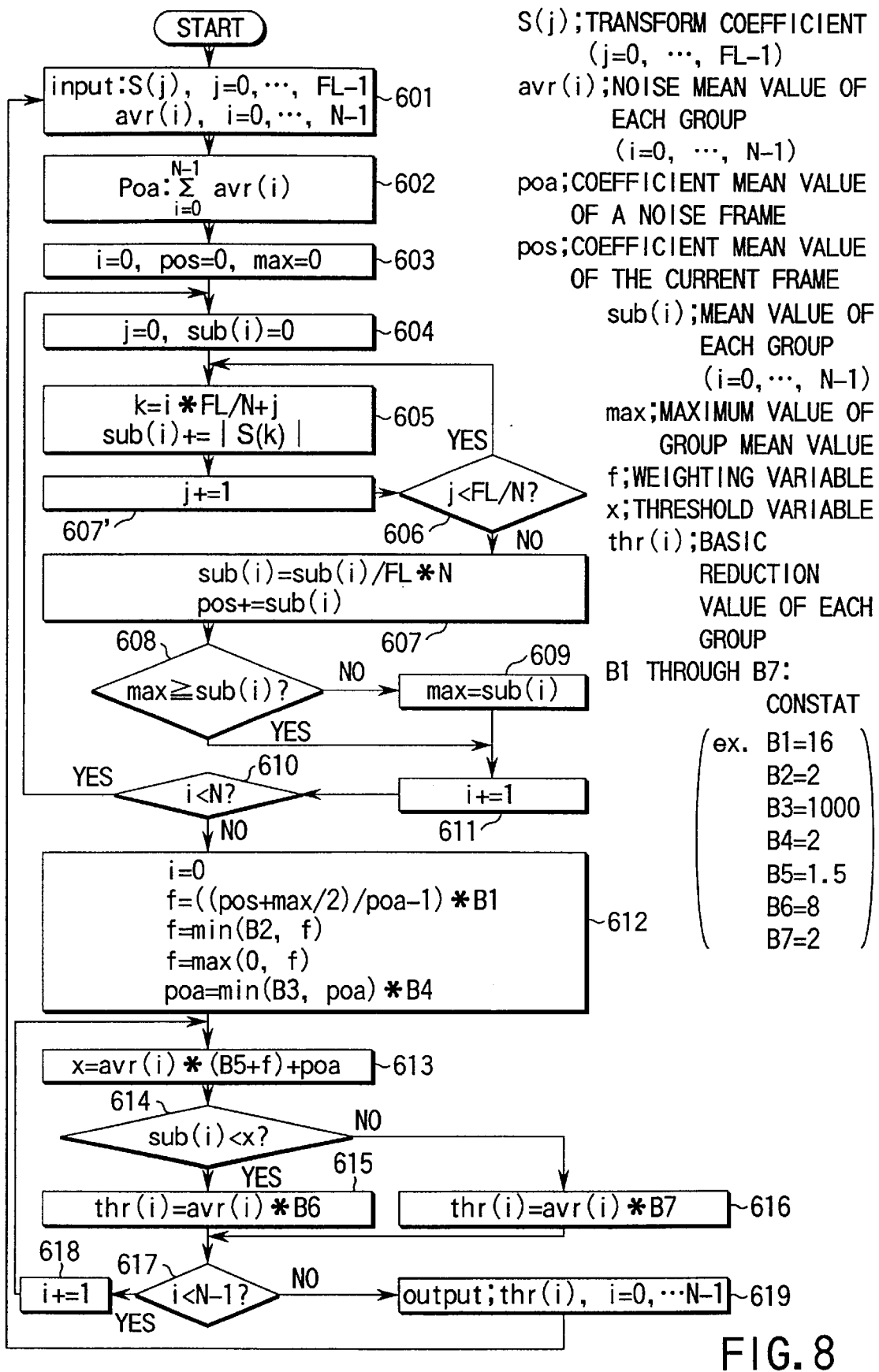
FIG. 8 is a flow chart showing the procedures of the group by group basic reduction value determining section of the noise canceler of FIG. 6.

FIG. 8 is a flow chart for the operation of the group by group basic reduction value determining section 104A, showing the procedures to be followed for carrying out the operation.

Referring to FIG. 8, the group by group basic reduction value determining section 104A firstly takes out the noise power value Pow in the noise power estimating section 102 and also the transform coefficients S(j) (j=0, . . . , FL−1) in the FFT 103 and also the noise mean value avr(i) of each of the groups produced from the group by group mean value estimating section 107 in Step 601. It then obtains the total sum Poa of the noise mean values avr(i) of the groups in Step 602.

The group by group basic reduction value determining section 104A resets the group number i, the coefficient mean value Pos of the current frame and the maximum value max of the coefficient mean values of the groups to the initial value of 0 in Step 603 and also j and the total sum of the absolute values Sub(i) of the transform coefficients of each of the groups to 0 in Step 604. It divides the transform coefficients S(j) into N groups and determines by calculation the total sum of the absolute values Sub(i) of the transform coefficients of each of the groups in Step 605. This operation of obtaining the total sum of the absolute values Sub(i) of transform coefficients is repeated each time j is incremented in Step 607 and terminated when j is found to be not smaller than FL/N in Step 607.

When the total sum of the absolute values Sub(i) is determined for the transform coefficients of the No. i=0 group, the group by group basic reduction value determining section 104A moves to Step 607, where the average of the total sums of the absolute values Sub(i) of the transform coefficients of all the groups is determined. At the same time, it also determines the coefficient mean value Pos of the current frame which is the sum of the mean values Sub(i) of all the groups. Then, in Steps 608 and 609, the maximum value max of the mean values Sub(i) of all the groups is found in Step 609.

The above operation of determining by calculation the mean value of Sub(i), that of the coefficients Pos of the current frame and the maximum value max of the mean values Sub(i) of all the groups is repeated each time i is incremented for each of the groups (i=0, . . . , N−1) in Step 611. If i=N is found or it is found that the above described series of processing steps is carried out for all the groups in Step 610, the operation proceeds to Step 612.

In Step 612, a weighting variable f is determined, using the coefficient mean value Pos of the current frame, the maximum value max of the mean values Sub(i) of all the groups and the total sum Poa of the noise mean values avr(i) of all the groups. In Step 613, the weighting variable f is multiplied by the noise mean and Poa is added to the product of the multiplication to determine a threshold variable x, provided that Poa does not exceeds B3 (B3=1000).

Then, in Step 614, the group's mean value Sub(i) is compared with the threshold variable x. If the group's mean value Sub(i) is found to be smaller than the threshold variable x as a result of the comparison, the operation proceeds to Step 615, where the basic reduction value thr(i) of the group is determined to be equal to the noise mean value avr(i) multiplied by a constant B6 (B6=8). If, on the other hand, the group's mean value Sub(i) is found to be not smaller than the threshold variable x, the operation proceeds to 616, where basic reduction value thr(i) of the group is determined to be equal to the noise mean value avr(i) multiplied by a constant B7 (B7=2).

The above operation of determining by calculation the threshold variable x, comparing the group's mean value Sub(i) with the threshold variable x and determining a basic reduction value thr(i) according to the result of the comparison is repeated for each of the groups (i=0, . . . , N−1) as i is incremented in Step 618. The above described series of processing steps is terminated for the current noise frame when it is found that i is equal to N, or i=N in Step 617.

Finally, the group by group basic reduction value determining section 104A goes from Step 617 to Step 619, where the obtained basic reduction values thr(i) are transmitted to the transform coefficient suppression section 105A for all the groups (i=0, . . . , N−1).

Figure 9:
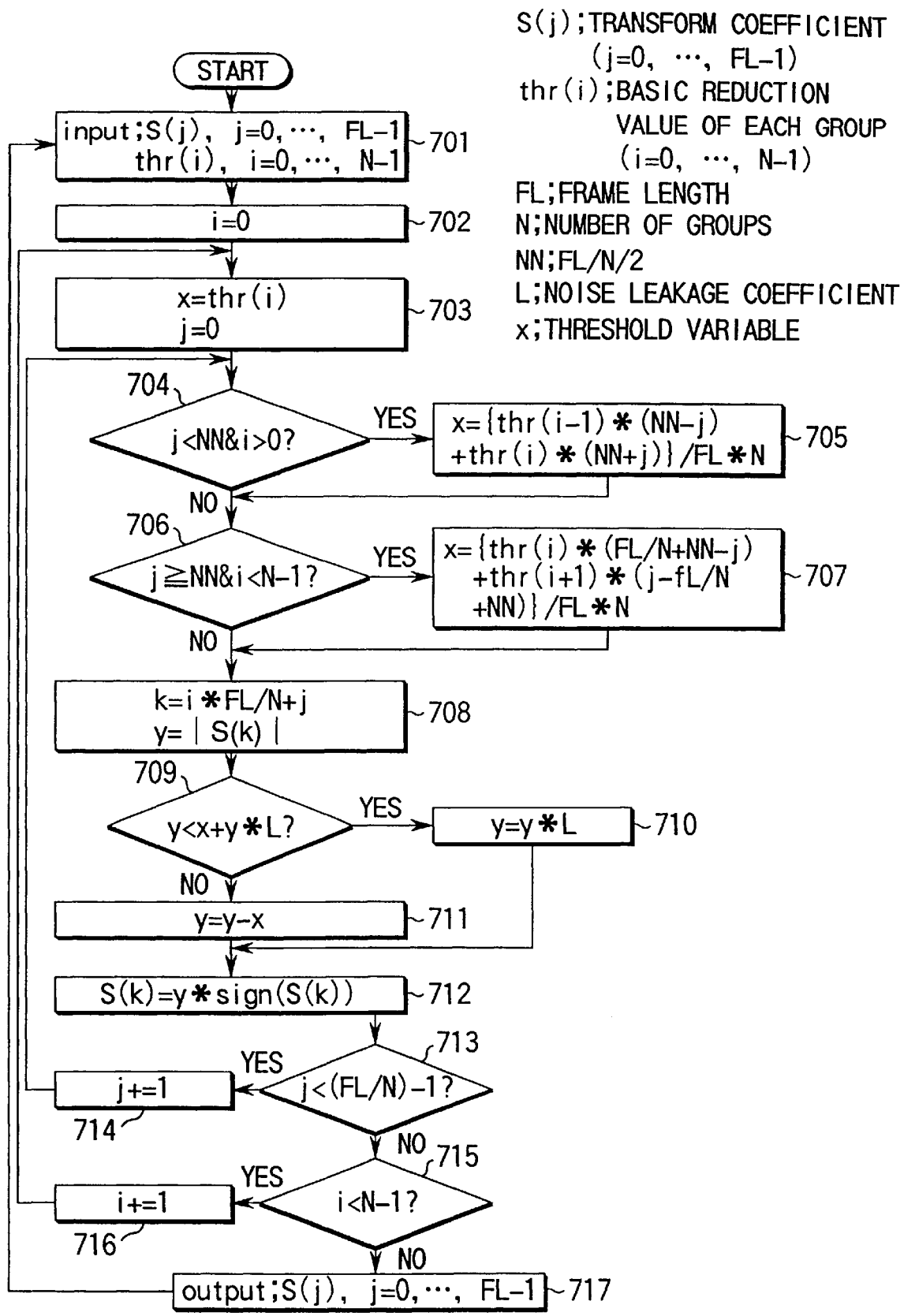
FIG. 9 is a flow chart showing the procedures of the operation of the transform coefficient suppression section of the noise canceler of FIG. 6.

The transform coefficient suppression section 105A operates for suppressing the transform coefficients S(j) (j=0, . . . , FL−1) fed from the FFT 103 on the basis of the basic reduction values thr(i) (i=0, . . . , N−1) in a manner as described blow. FIG. 9 is a flow chart for the operation of the transform coefficient suppression section 105A, showing the procedures to be followed for carrying out the operation.

Referring to FIG. 9, the transform coefficient suppression section 105A firstly takes out the basic reduction values thr(i) (i=0, . . . , N−1) in the group by group basic reduction value determining section 104A for all the groups and also the transform coefficients S(j) (j=0, . . . , FL−1) in the FFT 103 in Step 701. It then resets i to the initial value of i=0 in Step 702. Subsequently, makes the threshold variable x equal to thri(i), or x=thr(i), and initialize j to j=0 in Step 703, before it goes to Step 704, where it determines if the requirements of j<NN (NN=FL/n/2) and i>0 are met or not.

If it is found that the above requirement are met, the transform coefficient suppression section 105A selects the following value for the threshold variable x in Step 705.

$$x=\{thr(i-1)*(NN-j)+thr(i)*(NN+j)\}/FL*N$$

If, on the other hand, it is found in Step 704 that the above requirements are not met, the transform coefficient suppression section 105A determines if the requirements of j≧NN and i<N−1 are satisfied or not in Step 706. If it is found that the above requirements are satisfied, the transform coefficient suppression section 105A the following value for the threshold variable x in Step 707.

$$x=\{thr(i)*(FL/N+NN-j)+thr(i+j)*(j-FL/N+NN)\}1/FL*N$$

In other words, in this embodiment, a linearly interpolated value between the basic reduction value of another group having the closest value of coefficient S(k) and the basic reduction value thr(i) of the group to which coefficient s(k) belongs in order to eliminate any steps in the changing basic reduction value thr(i) in boundary areas of the group, although this operation of interpolation may not-be necessary when the steps, if any, in the changing basic reduction value thr(i) in boundary areas of the group do not exceed a predetermined value.

If the requirements of Step 706 are not met either, the transform coefficient suppression section 105A divides the transform coefficients S(j) into N groups in Step 708 and compares the absolute value y of coefficient S(k) of the i-th group with the sum of the threshold variable x and y*L in Step 709.

If it is found as a result of the comparison that the absolute value y of coefficient S(k) is not smaller than x+y*L, the transform coefficient suppression section 105A makes y equal to y*L, or y=y*L, in Step 710 and proceeds to Step 712. If, on the other hand, it is found that the absolute value y of coefficient S(k) is smaller than x+y*L, the transform coefficient suppression section 105A makes y equal to y−x, or y=y−x, in Step 711 and then proceeds to Step 712. In Step 712, it select the following value for the transform coefficient S(k).

$$S(k)=y*sign(S(k))$$

In other words, the coefficient S(k) is suppressed to the value obtained by subtracting x from the absolute value of S(k) when the absolute value y of coefficient S(k) is not smaller than x+y*L, whereas it is suppressed to the value obtained by multiplying the absolute value of S(k) by L.

Note that L is the noise leakage coefficient or the ratio at which the transform coefficient is left in the signal value without suppression. For instance, if L=0, 1, a ten percent of the transform coefficient is left unsuppressed and inversely transformed. It will be appreciated that, when the noise is loud and cannot be totally eliminated, the telephone conversation will sound natural if the noise partly leaks into the voice.

The transform coefficient suppression section 105A performs the above described processing operation for the coefficient S(i) of each of the groups and, when the above described steps for suppressing the transform coefficient of each and every one of the groups of the current frame are terminated, it moves to Step 717, where it outputs the above coefficients S(j).

The suppressed coefficients S(j) produced from the transform coefficient suppression section 105A are then given to an IFFT 106, which carries out a fast Fourier transform operation on the suppressed coefficients S(j) to put them back into a time base signal. The coefficients put back into a time base signal are then fed to the voice coding circuit 16.

As described above, the second embodiment of noise canceler according to the invention comprises a group by group mean value estimating section 107 for estimating the mean value of transform coefficients for each of the groups and determines a basic reduction value for the group, using the result of the estimated mean value of transform coefficients for the group so that the transform coefficients may be suppressed by the transform coefficient suppression section 105A on the basis of the obtained basic reduction values in order to eliminate noise in a highly precise and sophisticated manner.

(3rd Embodiment)

The third embodiment of the invention is designed to divide the transform coefficients obtained by an orthogonal transform by means of an FFT 103 into those belonging to a lower band and those belonging to a higher band in order to suppress the transform coefficients of the higher band on a group by group basis as in the case of the second embodiment and those of the lower band by using a unitary gain in a lower band coefficient suppression section.

Figure 10:
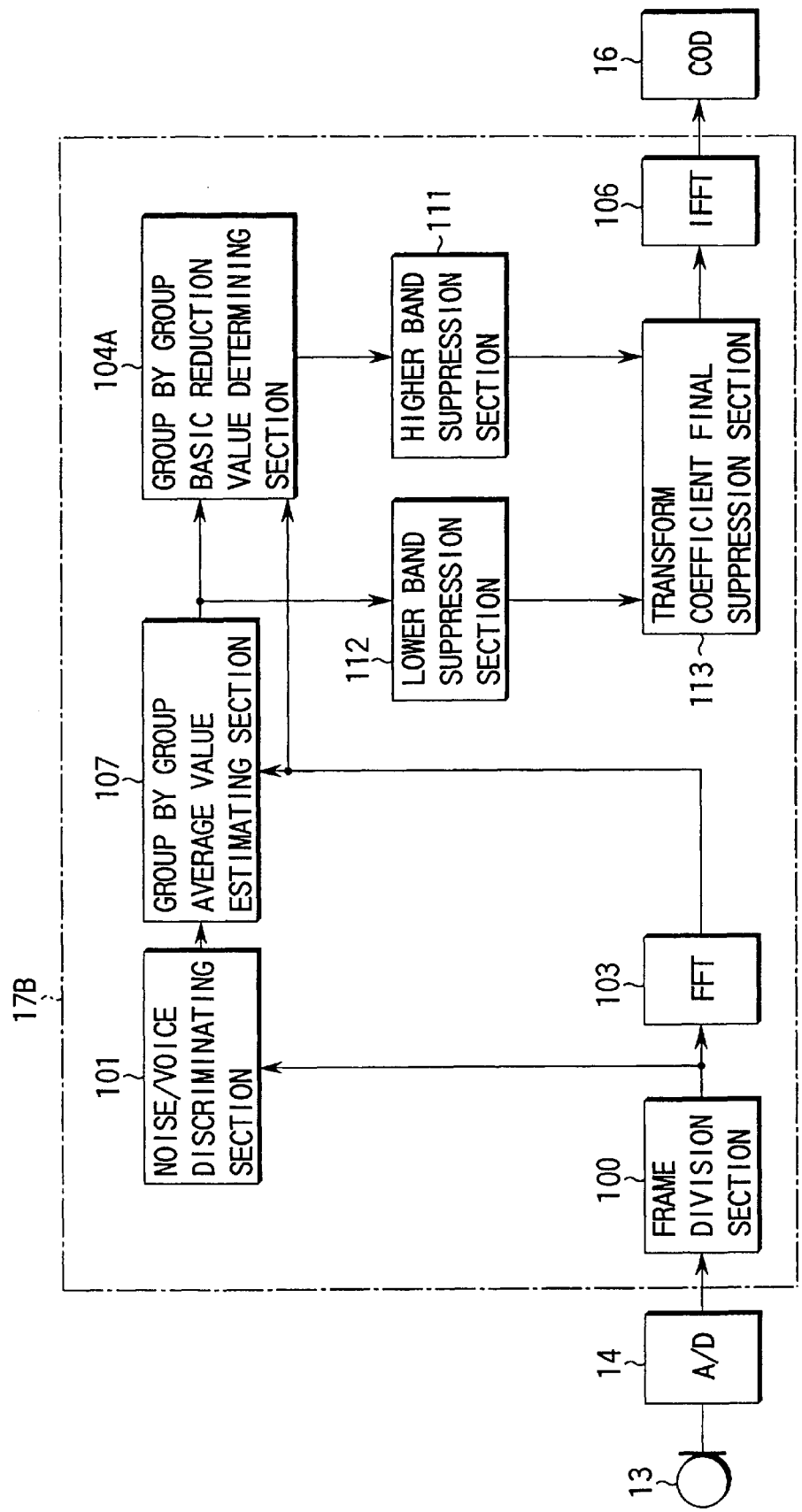
FIG. 10 is a circuit block diagram of a third embodiment of noise canceler according to the invention.

FIG. 10 is a circuit block diagram of the third embodiment of noise canceler according to the invention. The components that are similar to those of FIG. 6 are denoted respectively by the same reference symbols and will not be described any further.

The noise canceler 17B of this embodiment comprises a higher band transform coefficient suppression section 111, a lower band transform coefficient suppression section 112 and a transform coefficient final suppression section 113 for transform coefficient suppressing operations.

Of these, the higher band transform coefficient suppression section 111 suppresses the transform coefficients in a higher band on a group by group basis according to the basic reduction value determined by the group by group basic reduction value determining section 104A. The operational procedures of the transform coefficient suppression section 111 are substantially same as those of the transform coefficient suppression section 105A in FIG. 9, the difference between them being that S1(k) are determined by calculation for the higher band in Step 712 and transform coefficient values S1(j) (j=0, . . . , FL−1) are produced as output after the suppression of the higher band in Step 717.

On the other hand, the lower band transform coefficient suppression section 112 picks up the transform coefficients S(j) produced from the FFT 103 and the noise mean values avr(j) of each of the groups produced from the group by group mean value estimating section 107. Then, it determines the mean value of transform coefficients S(j) of a plurality of groups belonging to the lower band on the basis of the transform coefficients S(j) and also the mean value of noises in the lower band on the basis of the noise mean values avr(j) of the groups so that it can determine a lower band suppression quantum r on the basis of the ratio of the transform coefficient mean value and the noise mean value. Then, the noise canceler uniformly suppresses all the transform coefficients contained in the lower band by said lower band suppression quantum r and its output is used as lower band transform coefficient after the suppression.

Figure 11:
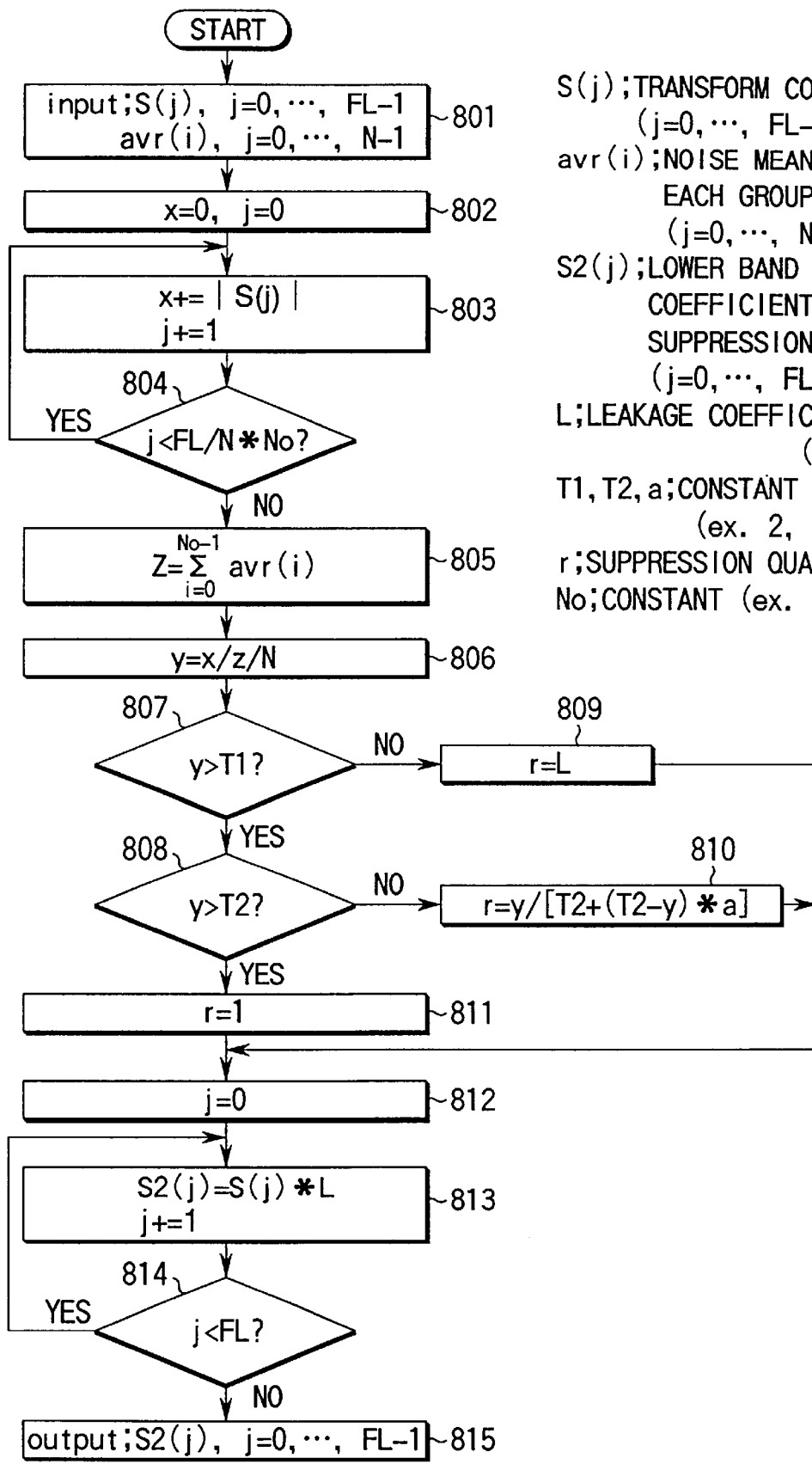
FIG. 11 is a flow chart showing the procedures of the operation of the lower band coefficient suppression section of the noise canceler of FIG. 10.

FIG. 11 is a flow chart for the operation of the lower band transform coefficient suppression section 112, showing the procedures to be followed for carrying out the operation. In Step 801, it receives the transform coefficients S(j) produced from the FFT 103 and the noise mean values avr(j) of the groups produced from the group by group mean value estimating section 107.

Then, it initializes x and j respectively to x=1 and j=1 in Step 802 and repeats the operation of averaging transform coefficients in Step 803 until j<FL/N*N0 is detected in Step 804. As a result of this repeated operation, the average of the transform coefficients for the group N0 belonging to the lower band is determined by calculation.

N0 is a group defined in advance according to the pitch cycles of the voice currently being transmitted. If, for example, the pitch cycles of the voice is 20 to 160 and the voice sampling frequency of the A/D converter 14 is 8 kHz, the following value will be obtained.

8 kHz/20 to 160=400 to 50 Hz

Therefore, N0 may be defined as N corresponding to 500 Hz that is the upper limit of the lower band with an allowance of 100 Hz added to the above 400 Hz.

Then, the mean value Z of the noises for group N0 belonging to the lower band is determined by calculation in Step 805. In Step 806, it is determined how many times the transform coefficient mean value x is greater than the noise mean value Z and, in Steps 807 through 811, a suppression quantum r is determined on the basis of the obtained ratio. More specifically, in Steps 807 and 808, it is determined if y>T1 or y>T2. If it is found that y>T1 is not true, the operation proceeds to Step 809, where r=L is used to determine if y>T1 is true but y>T2 is not true. If so, the operation goes to Step 809, where r=y/[T2+(T2−y)*a] is used and, if additionally y>T2 holds true, r=1 is made to hold true.

Finally, in Step 812, j is initialized to j=0 and then, in Step 813, the operation of multiplying the transform coefficient by the above suppression quantum r is repeated until j<FL is found to hold true in Step 813. As a result of this repetitive operation, S2(j) are obtained by multiplying all the transform coefficients uniformly by said suppression quantum 4. The values of S2(j) are then produced to the transform coefficient final suppression section 113 as lower band transform coefficient values after the suppression in Step 815.

The transform coefficient final suppressing section 113 determines a coefficient suppression quantum for an intermediate band on the basis of the higher band suppression coefficient values S1(j) produced from the higher band coefficient suppression section 111 and the lower band suppression coefficient values S2(j) produced from the lower band coefficient suppression section 112 and then carries out a final suppressing operation on the group by group transform coefficient values of each of the lower, intermediate and higher bands.

Figure 12:
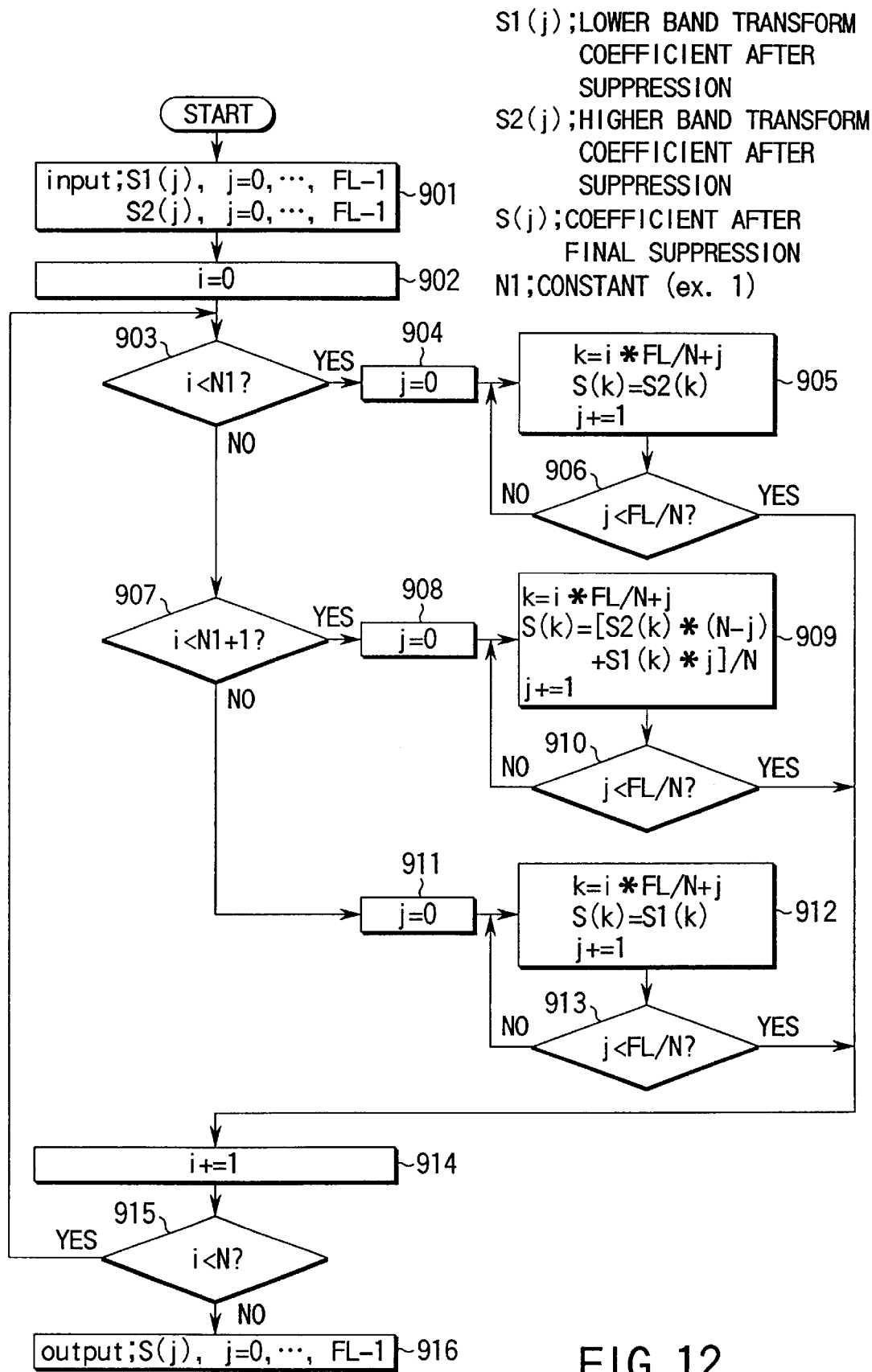
FIG. 12 is a flow chart showing the procedures of the operation of the coefficient final suppression section of the noise canceler of FIG. 10.

FIG. 12 is a flow chart for the operation of the transform coefficient final suppression section 112, showing the procedures to be followed for carrying out the operation. In Step 901, it receives the higher band suppression coefficient values S1(j) produced from the higher band transform coefficient suppressing section 111 and the lower band suppression coefficient values S2(j) produced from the lower band transform coefficient suppressing section 112.

Then, it carries out a final transform coefficient suppressing operation for each of the lower band, the higher band and the intermediate band on the basis of the higher band suppression coefficient values S1(j) and the lower band suppression coefficient values S2(j). More specifically, the transform coefficient final suppressing section 113 moves from Step 903 through Step 904 to Step 905, where it uses the value of S2(k) produced from said lower band transform coefficient suppressing section 112 as final suppression coefficient for each of the groups with group Nos. 0 through N1 belonging to the lower band. On the other hand, it moves from Step 907 through Step 908 to Step 909, where it determines a weighted average value of the higher band suppression coefficient value S1(k) and the lower band suppression coefficient value S2(k) to be used as final suppression coefficient for the group with group No. N1+1 which belongs to the intermediate band. Finally, it moves from Step 907 through Step 911 to Step 912, where it uses the value of S1(k) produced from the higher band transform coefficient suppressing section 111 as final suppression coefficient for each of the groups with group Nos. N1+2 and above that belong to the higher band.

When the operation of final suppression is over for all the groups, it proceeds to Step 916, where it outputs the transform coefficients S(j) (j=0, . . . , FL−1) after the final suppression.

Figure 13:
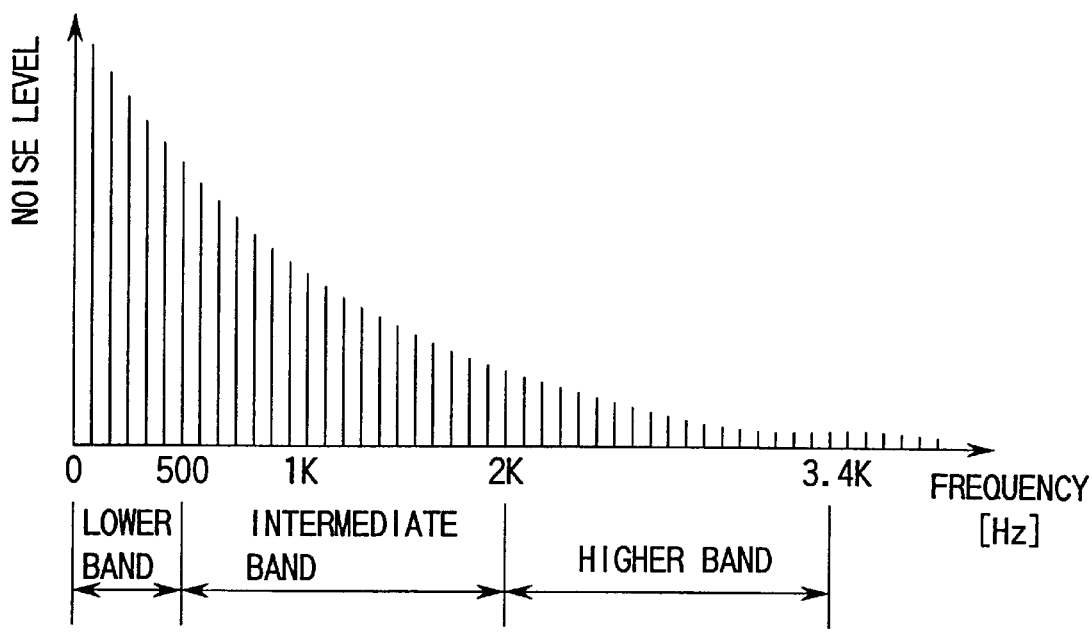
FIG. 13 is a graph showing an example of zoning the frequency band and the spectral noise distribution.

As described earlier, if an upper limit frequency value of 500 Hz is used for the lower band, the intermediate band may typically be defined as a frequency band between 500 Hz and 2 kHz, while the higher band may be defined as a zone from 2 kHz to 3.4 kHz which is commonly the highest audible frequency. FIG. 13 shows the relationship between these zones and the spectral distribution of noise level.

As will be clearly appreciated from the above description, the third embodiment is characterized in that the grouped transform coefficients are further divided into those belonging to a lower band and those belonging to a higher band and different reduction values are provided respectively for the transform coefficients belonging to the higher band by the group by group basic reduction value determining section 104A as in the case of the second embodiment so that the higher band transform coefficient suppressing section 111 may operate for suppression on the basis of these reduction values, whereas a single reduction value is selected by the lower band transform coefficient suppressing section 112 for the transform coefficients belonging to the lower band so that the transform coefficients of the lower band may be processed for suppression by multiplying them by the single reduction value. Additionally, the groups belonging to the higher band are further divided into those belonging to an intermediate band and those found above the intermediate band and the transform coefficients belonging to the intermediate band are suppressed by multiplying them with a weighted average of the reduction value selected for the lower band and the reduction value selected for the higher band.

Thus, if an FFT with a number of dimensions smaller than the pitch cycles of voice is used for the FFT 103, the signal components belonging to the lower band that occupy a large proportion of the voice spectrum are free from distortions as shown in FIG. 13 so that a high quality noise canceling operation can be provided by the embodiment to eliminate any distorted voice sound.

Additionally, with the third embodiment, an intermediate band is defined between the higher band and the lower band and the transform coefficients belonging to this band are processed for suppression by using a weighted average of the reduction value for the lower band and the reduction value for the higher band. Therefore, the noise suppression performance of the noise canceler shows an enhanced linear continuity in the intermediate frequency band connecting the lower band and the higher band to realize a smooth suppression effect.

Figure 14:
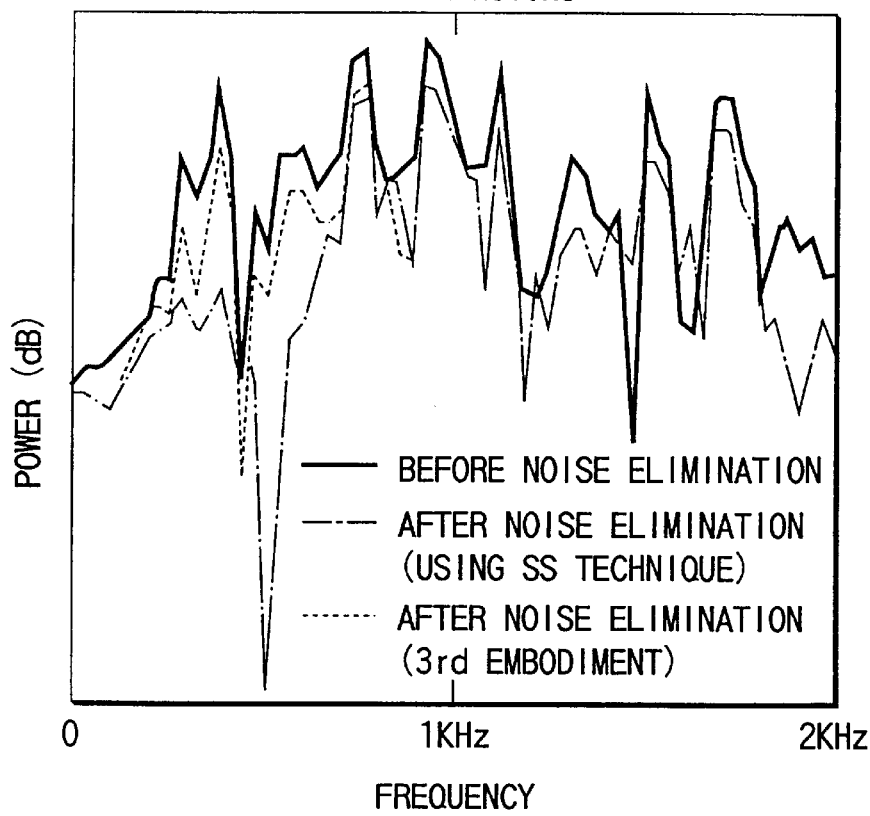
FIG. 14 is a graph showing the frequency-based voice quality improving effect of the third embodiment.

FIG. 14 is a graph showing the relationship between the power and the frequency of a single voice frame before and after the use of the third embodiment of noise canceler utilizing an FFT with 64 dimensions and designed to eliminate noise components in all the bands by means of an SS technique. As seen from FIG. 14, the power drop in the voice frames at and near 500 Hz in the lower band is effectively prevented to ensure an excellent voice quality.

It should be noted that the present invention is by no means limited to the above embodiments. For example, while the mean square is used, the sum of the absolute values may alternatively be used. While all the groups has a same number of transform coefficients in each of the above embodiments, they may alternatively have different numbers of coefficients. The FFT may be replaced by a DFT (discrete Fourier transform), a DCT (discrete cosine transform), a Haare transform or a Karhunen-Loeve transform.

While the transform coefficients are divided into a lower band, a higher band and an intermediate band for suppression in the third embodiment, they may alternatively be divided into only a higher band and a lower band if a FFT with less than 32 dimensions is used.

Furthermore, while the transform coefficients of all the bands are divided into groups in the first place and the mean values are determined for the respective bands before they are divided into the bands in the third embodiment, other grouping techniques may alternatively be used. For example, they may be divided into bands and only those belonging to the higher band and the intermediate band and requiring a suppressing operation may be grouped for such an operation. With this arrangement, the transform coefficients of the lower band are free from grouping and hence the entire operation may be simplified so much.

Finally, the number of groups for grouping the transform coefficients, the procedures for determining the basic reduction value, those for suppressing the transform coefficients, the upper value of the lower band to be used for band splitting, the frequency separating the intermediate band and the higher band and the type and configuration of the telecommunications apparatus may be modified appropriately without departing from the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A telecommunication apparatus, comprising:
(A) a main circuit for encoding a sending speech signal and transmitting said coded sending speech signal; and
(B) a noise canceler arranged upstream relative to said main circuit for carrying out an operation of removing noise components contained in said sending speech signal, wherein said noise canceler includes:
  (1) frame division means for dividing said sending speech signal into frames with a constant frame length;
  (2) orthogonal transform means for carrying out an orthogonal transform for frequency analysis on each frame produced by said frame division means and for generating a plurality of transform coefficients on the each frame;
  (3) suppression means for dividing the transform coefficients into a plurality of groups and suppressing the divided transform coefficients, wherein said suppression means includes:
    (a) means for determining a mean value of the transform coefficients of each of the plurality of groups;
    (b) comparison means for comparing the mean value of the transform coefficients of each of the plurality of groups with a predetermined threshold value; and
    (c) means for setting the transform coefficients of each group at a predetermined minimum value when said comparison means determines that the mean value of the transform coefficients does not exceed the threshold value, and for suppressing the transform coefficients of each group in accordance with the transform coefficients when said comparison means determines that the mean value of the transform coefficients exceeds the threshold value; and
  (4) inverse orthogonal transform means for carrying out an inverse orthogonal transform on the suppressed transform coefficients.

2. A telecommunication apparatus comprising:
(A) a main circuit for encoding a sending speech signal and transmitting said coded sending speech signal; and
(B) a noise canceler arranged upstream relative to said main circuit for carrying out an operation of removing noise components contained in said sending speech signal, said noise canceler including:
  (1) frame division means for dividing said sending speech signal into frames with a constant frame length;
  (2) orthogonal transform means for carrying out an orthogonal transform for frequency analysis on each frame produced by said frame division means and for generating a plurality of transform coefficients on the each frame;
  (3) suppression means for dividing the transform coefficients into a plurality of groups and suppressing the divided transform coefficients, wherein said suppression means includes:
    (a) means for determining a mean value of the transform coefficients of each of the plurality of groups;
    (b) comparison means for comparing the mean value of the transform coefficients of each of the plurality of groups with a predetermined threshold value; and
    (c) means for setting the transform coefficients of each group at a predetermined minimum value when said comparison means determines that the mean value of the transform coefficients does not exceed the threshold value, and for suppressing the transform coefficients of each group in accordance with a square value of the transform coefficients when said comparison means determines that the mean value of the transform coefficients exceeds the threshold value; and (4) inverse orthogonal transform means for carrying out an inverse orthogonal transform on the suppressed transform coefficients.

3. A telecommunication apparatus, comprising:

(A) a main circuit for encoding a sending speech signal and transmitting said coded sending speech signal; and (B) a noise canceler arranged upstream relative to said main circuit for carrying out an operation of removing noise components contained in said sending speech signal, wherein said noise canceler includes:

(1) frame division means for dividing said sending speech signal into frames with a constant frame length;

(2) orthogonal transform means for carrying out an orthogonal transform for frequency analysis on each frame produced by said frame division means and for generating a plurality of transform coefficients on the each frame;

(3) suppression means for dividing the transform coefficients into a plurality of groups and suppressing the divided transform coefficients, wherein said suppression means includes:

(a) means for determining a square mean value of the transform coefficients of each of the plurality of groups;

(b) comparison means for comparing the square mean value of the transform coefficients of each of the plurality of groups with a predetermined threshold value; and (c) means for setting the transform coefficients of each group at a predetermined minimum value when said comparison means determines that the square mean value of the transform coefficients does not exceed the threshold value, and for suppressing the transform coefficients of each group in accordance with the transform coefficients when said comparison means determines that the square mean value of the transform coefficients exceeds the threshold value; and (4) inverse orthogonal transform means for carrying out an inverse orthogonal transform on the suppressed transform coefficients.

4. A telecommunication apparatus, comprising:

(A) a main circuit for encoding a sending speech signal and transmitting said coded sending speech signal; and (A) a noise canceler arranged upstream relative to said main circuit for carrying out an operation of removing noise components contained in said sending speech signal, wherein said noise canceler includes:

(1) frame division means for diving said sending speech signal into frames with a constant frames with a constant frame length;

(2) orthogonal transform means for carrying out an orthogonal transform for frequency analysis on each frame produced by said frame division means and for generating a plurality of transform coefficients on the each frame;

(3) suppression means for dividing the transform coefficients into a plurality of groups and suppressing the divided transforms coefficients, wherein said suppression mean includes:

(a) means for determining a mean value of the transform coefficients of each of the plurality of groups;

(b) comparison means for comparing the mean value of the transform coefficients of each of the plurality of groups with a predetermined threshold value; and (c) means for suppressing the transform coefficients of each group in accordance with the transform coefficients when said comparison means determines that the threshold value; and (4) inverse orthogonal transform means for carrying out an inverse orthogonal transform on the suppressed transform coefficients.

* * * * *